US008613663B2

(12) United States Patent
Harvey et al.

(10) Patent No.: US 8,613,663 B2
(45) Date of Patent: Dec. 24, 2013

(54) MULTI-MONITOR SUPPORT FOR GAMING DEVICES AND RELATED METHODS

(75) Inventors: Nathan K. Harvey, Pahrump, NV (US); Pravinkumar Patel, Las Vegas, NV (US); James Schaefer, Henderson, NV (US); Michael N. Dubose, Henderson, NV (US)

(73) Assignee: Bally Gaming, Inc., Las Vegas, NV (US)

( * ) Notice: Subject to any disclaimer, the term of this patent is extended or adjusted under 35 U.S.C. 154(b) by 320 days.

(21) Appl. No.: 12/619,646

(22) Filed: Nov. 16, 2009

(65) Prior Publication Data

US 2011/0117994 A1 May 19, 2011

(51) Int. Cl.
*A63F 9/24* (2006.01)
*A63F 13/00* (2006.01)

(52) U.S. Cl.
USPC .................... 463/31; 463/16; 463/20; 463/30

(58) Field of Classification Search
USPC .......................................... 463/16, 20, 30, 31
See application file for complete search history.

(56) References Cited

U.S. PATENT DOCUMENTS

| | | | | |
|---|---|---|---|---|
| 7,766,742 B2 * | 8/2010 | Bennett et al. | 463/20 |
| 7,871,326 B2 * | 1/2011 | Wright et al. | 463/25 |
| 8,021,230 B2 * | 9/2011 | Baerlocher et al. | 463/25 |
| 8,109,821 B2 * | 2/2012 | Kovacs et al. | 463/16 |
| 2002/0151360 A1 * | 10/2002 | Durham et al. | 463/30 |
| 2006/0282855 A1 * | 12/2006 | Margulis | 725/43 |
| 2007/0038939 A1 * | 2/2007 | Challen et al. | 715/734 |
| 2007/0099688 A1 * | 5/2007 | Brosnan et al. | 463/16 |
| 2008/0102916 A1 * | 5/2008 | Kovacs et al. | 463/16 |

* cited by examiner

*Primary Examiner* — Dmitry Suhol
*Assistant Examiner* — Ryan Hsu
(74) *Attorney, Agent, or Firm* — Brooke Quist; Marvin Hein

(57) ABSTRACT

Various embodiments are directed to gaming machines having multi-monitor support for controlling up to four monitors on a gaming device. According to one embodiment, the gaming device includes a first display for presenting a primary game. The gaming device also includes a second display and a third display where the second display is positioned above the third display. The second and third displays are used in combination to present a secondary game. The gaming device further includes a multi-core processor in communication with a first video chipset and a second video chipset, wherein the first and second video chipsets support the first, second and third monitors.

7 Claims, 10 Drawing Sheets

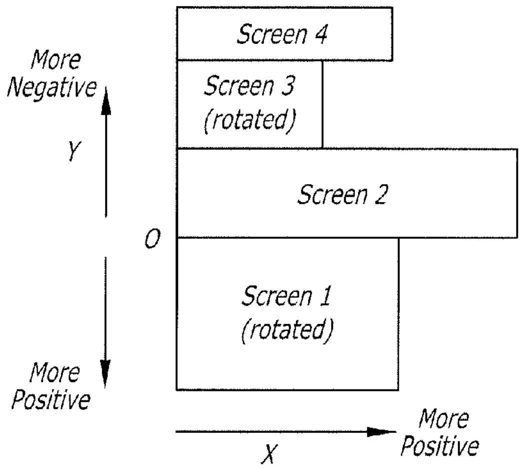
FIG. 4
FIG. 5
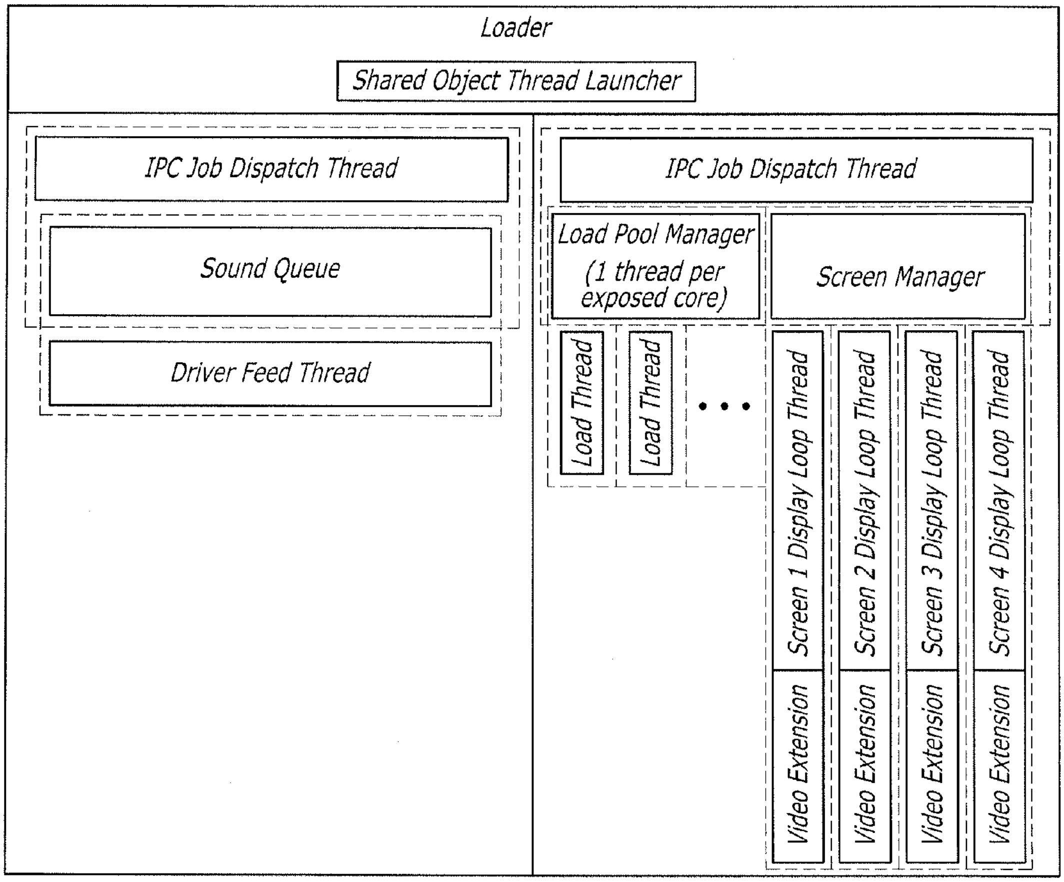

MULTI-MONITOR SUPPORT FOR GAMING DEVICES AND RELATED METHODS

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

FIELD

Embodiments are directed to gaming devices having multi-monitor support.

BACKGROUND

Over the years, gaming machines have grown in both sophistication and gaming features to maintain player interest. Gaming machines have gone from relatively simple devices providing a player with an opportunity to win cash awards to sophisticated, multi-media devices. Even more, the games presented on the gaming machines have become increasingly intricate. For example, slot-style games may include five or more reels with twenty or more paylines. Furthermore, games may include one or more bonus games or different game modes that allow a player to participate in a community game or a tournament. Accordingly, with the increasing complexity of these games, there is a continuing need for gaming machines to have the capabilities to support these games.

SUMMARY

Briefly, and in general terms, various embodiments are directed to gaming machines having multi-monitor support for controlling a plurality of monitors on a gaming device. According to one embodiment, the gaming device includes a first, second, and third monitors mounted in a gaming cabinet, wherein at least the first monitor presents one or more games. The gaming device also includes a multi-core processor in communication with a first video chipset and a second video chipset, wherein the first and second video chipsets support the first, second and third monitors.

Additionally, multi-monitor games may be presented on the gaming device. One method for presenting a multi-monitor game on a gaming device includes: providing a gaming device, wherein the gaming device includes a first display, a second display, a third display, and a multi-core processor in communication with a first video chipset and a second video chipset, wherein the first and second video chipsets support the first, second and third displays; initiating play of a primary game on the first display in response to a player wager; determining whether a triggering event has been established during play of the primary game; reconfiguring the first, second, and third displays to present a secondary game, wherein the secondary game includes a plurality of configurations based on the amount of the player wager; receiving player input initiating play of the secondary game; presenting the secondary game on the first, second, and third displays; and awarding credits to the player based on an outcome of the secondary game.

Other features and advantages will become apparent from the following detailed description, taken in conjunction with the accompanying drawings, which illustrate by way of example, the features of the various embodiments.

BRIEF DESCRIPTION OF THE DRAWINGS

FIG. 4 is a schematic diagram of another embodiment of a layout for multiple monitors.

FIG. 5 is a block diagram illustrating one embodiment of a threading design for providing multi-monitor support.

DETAILED DESCRIPTION

Various embodiments are directed to gaming machines having multi-monitor support for controlling a plurality of monitors on a gaming device. In one embodiment, the gaming device uses a multi-core processor and two different video controller chips to seamlessly support up to four monitors on a gaming device. Additionally, an Alpha Video Server is provided to manage communication with one or more X servers, in which each X server supports a video chipset. The Alpha Video Server also exposes an abstraction to the games to allow for transparent access to each monitor.

Figure 1:
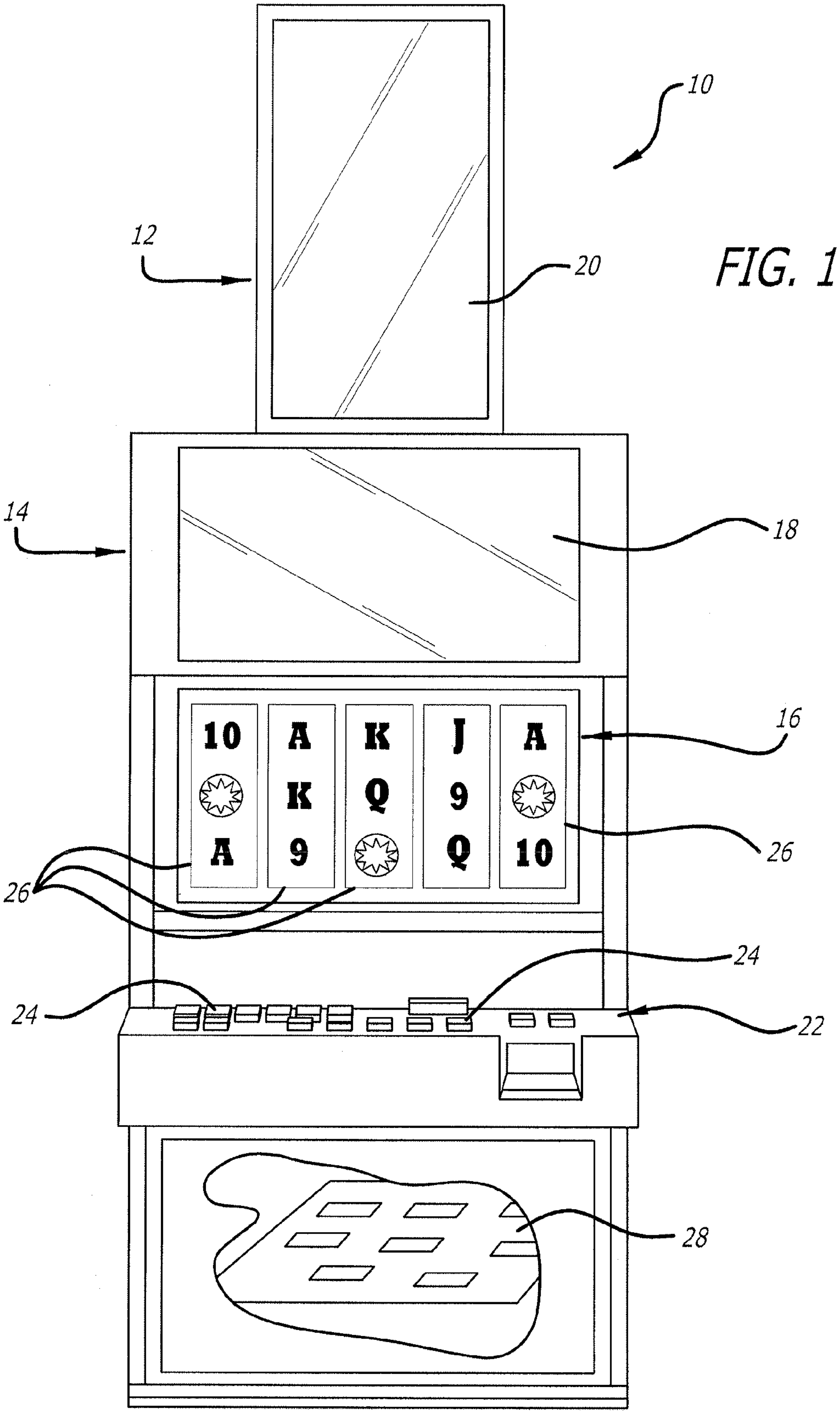
FIG. 1 is a perspective view of one embodiment of a gaming device having multiple displays.

Referring now to the drawings, wherein like reference numerals denote like or corresponding parts throughout the drawings and, more particularly to FIGS. 1-12, there are shown various embodiments of a gaming device having multiple monitors. More specifically, as shown in FIG. 1, the gaming machine 10 includes a first display 16, a second display 18, and a third display 20. In the embodiment depicted in FIG. 1, the third display 20 is mounted in the top box 12, and the first and second displays 16, 18 are mounted in the main cabinet 14. In other embodiments, the displays 16, 18, 20 may be mounted in any combination within the main cabinet 14 and/or the top box 12. Optionally, a gaming device may include a fourth monitor (not shown). In one embodiment, the fourth monitor (not shown) is a part of the player interface 22. In this embodiment, the fourth monitor (not shown) is used in conjunction with a touch screen to form a virtual button deck.

As shown in FIG. 1, the first and second displays 16, 18 are mounted in a landscape orientation and the third display 20 is mounted in a portrait orientation. In other embodiments, the displays 16, 18, 20 may be mounted in the gaming cabinet 14 and/or top box 12 in a portrait or landscape orientation. In another embodiment, the displays 16, 18, 20 may also include a touch screen or touch glass system (not shown). For example, the touch screen is a transparent, flat surface positioned over the displays 16, 18, 20, as disclosed in U.S. patent application Ser. No. 11/209,895, filed Aug. 21, 2005, which is hereby incorporated by reference.

According to one embodiment, the displays 16, 18, 20 are widescreen displays (e.g., 16:9 or 16:10 aspect ratio display). In one embodiment, the 16, 18, 20 are flat-panel display including by way of example only, and not by way of limitation, liquid crystal, plasma, electroluminescent, vacuum fluorescent, field emission, LCOS (liquid crystal on silicon), and SXRD (Silicon Xtal Reflective Display), or any other type of panel display known or developed in the art. These flat-panel displays may use panel technologies to provide digital quality images including by way of example only, and not by way of limitation, EDTV, HDTV, or DLP (Digital Light Processing). In other embodiments, the displays 16, 18, 20 may be electroluminescent displays, an organic light emitting diode (OLED) displays, electronic paper (e-paper) displays, video displays incorporating Rosco film, an array of LEDs, or any combination thereof.

As shown in FIG. 1, the first display 16 presents a video depiction of a plurality of mechanical reels used to play a slots-style game. Alternatively, the first display 16 may present other games such as, but not limited to, mechanical slots, video slots, video keno, video poker, video blackjack, video roulette, Class II bingo, games of skill, games of chance involving some player skill, any Class II games, any Class III games, or any combination thereof. Similarly, the second and/or third displays 18, 20 may also be used to present games. Additionally, the displays 16, 18, 20 may be configured and/or reconfigured to display the name of the game, pay tables, progressive jackpot information, progressive or other jackpot meters, group play games and/or information, tournament games and/or information, or non-game related information (e.g., news, advertisements, or promotions).

Figure 2:
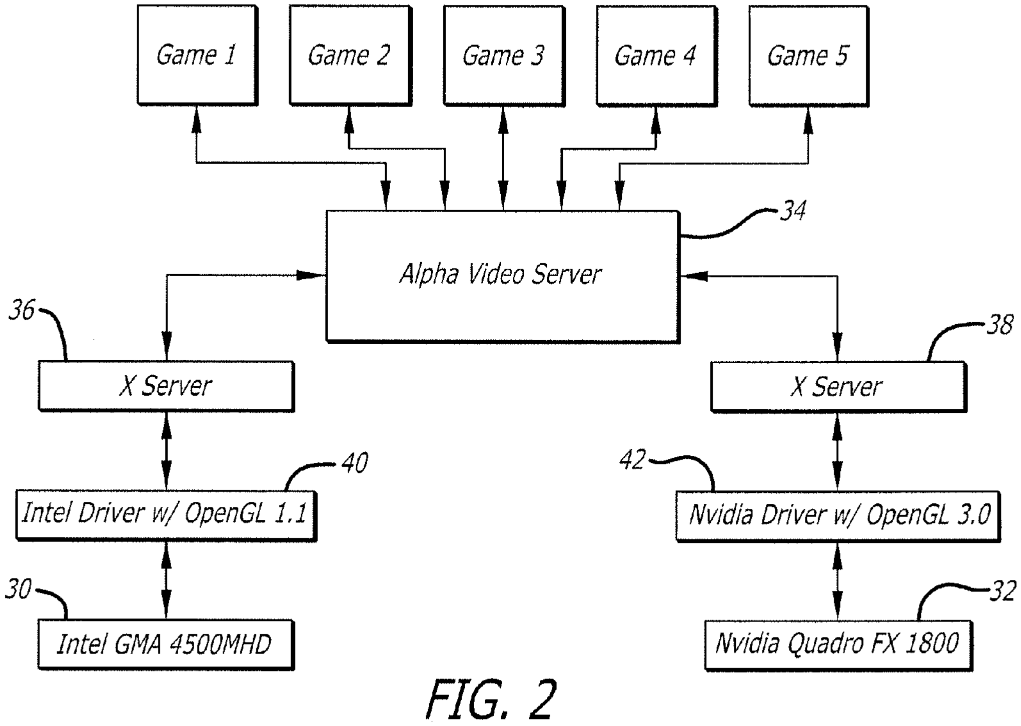
FIG. 2 is a block diagram of the components used to provide multi-monitor support.

FIG. 2 illustrates the hardware and software components in order to support the displays 16, 18, 20. As shown in FIG. 2, the gaming device 10 includes an onboard Intel GMA4500 MHD video chipset 30 that provides support for two monitors. In the embodiment shown in FIG. 2, the gaming device also includes a NVIDIA Quadro FX 1800 card 32 that provides high-quality 3D pipeline support with output to two additional monitors. The Intel GMA4500 MHD video chipset 30 communicates with its dedicated X server 36 via an Intel driver with Open GL 1.1. The NVIDIA Quadro FX 1800 card 32 communicates with its dedicated X server 38 via a NVIDIA driver with Open GL 3.0. To provide support for monitors controlled by two different controller chips, an abstraction is exposed to the games to provide transparent access to each monitor. The abstraction assigns numbers the monitors in a deterministic fashion, and an interface is used to derive x-y regions for the root sprite of each monitor so they can continue to be used.

Behind the interface, an Alpha Video Server 34 (generic term for either GL or legacy servers) manages communications with the X servers 36, 38 for each chipset. Generally, an abstraction is used between the X server and driver such as, but not limited to, a XGL interface. The XGL interface provides backend support to X Windows rendering to Open GL drivers. Other driver interfaces such as, but not limited to, EGL and DirectFB may also be used in other embodiments. Alternatively, if the X Windows system is a recent version, the software is flexible enough to configure itself to different machines and/or to determine the proper interface for each driver.

During X windows start-up, two scripts work together to do the initial video configuration. A video-init script inspects the lspci output to determine which graphics chipsets are reported available on the system's Northbridge. Based on the chipsets discovered, the video-init selects the drivers to run. The proper drivers include, but are not limited to, NVIDIA, Intel, VIA, or VESA drivers. An insert module (insmods) installs the drivers into the kernel.

The video-init script then runs a resolution configuration (resconfig) program to determine the appropriate resolutions for the monitors. The resconfig program also sets a number of common environment variables based on the information in the video.cfg file, which will be needed by the Alpha video server when it launches. If the monitors on the gaming device have different resolutions, the X servers are loaded with a layout configuration of the screens. If the monitors have the same resolution, the X servers are loaded with a screen configuration. In the event that a NVIDIA chip is discovered, the resconfig launches X_init to configure and run the X Server. The X_init script launches X font service and then start the Xorg server. At the end of the X windows start-up, both the Intel chip and the NVIDIA chips both have appropriate drivers installed and X sessions run for each device.

In order for the games to properly set up their screen layout resolutions, the video configuration (video.cfg) file is updated, yet the video configuration file is also backward compatible to the layouts specified in legacy games. In order to achieve these goals, the video configuration file includes a new version variable at the top of the file. A game labelled as version 2 indicates that the game can use the four-monitor support provided by the gaming device. The config file also lists the screens needed by number, resolution, and rotation. An example of the config file is as follows:

Version=2
Screen 1=1280×10$^{24}$R
Screen 2=1280×10$^{24}$R
Screen 3=800×600

As shown above, the screens are numbered 1-4, just as they are accessed through the API, and the "R" after the screen resolutions represents that the screen is rotated. Only those screens listed in the file are supported. Accordingly, in the above example, screen 4 would not be accessible and assumed not to be present.

The ordering of the screens is deterministic (i.e., based on ports plugged). According to one embodiment, it is determined that screens 1 and 2 are NVIDIA supported screens and screens 3 and 4 are Intel supported screen. Alternatively, screens 1 and 2 are Intel supported screens and screens 3 and 4 are NVIDIA supported screens.

The boot process uses environment variables to indicate to the booting video server what settings were adopted during earlier driver and X server configurations. The legacy environment variables include:

NV_PREFETCH_MEM is a prefetchable address space for direct blitting interfaces to the NVIDIA card. (In alternate embodiments, X blitting through shared memory may be used.)

AGKVIDEO is a primary video configuration variable. The AGKVIDEO describes which video server to run and, optionally, prefetch information and resolutions for legacy video.

AGKVIDEODEPTH is a pixel depth descriptor.

Depth is another pixel depth descriptor. This is X Windows environment variable for selecting in XF86Config-4.

VIDEOMEM2 is a memory offset for a second framebuffer when running with X windows in legacy mode.

AGKVIDEOWIDTH is the main screen width.

AGKVIDEOHEIGHT is the main screen height.

AGKVIDEOWIDTH2 is the secondary screen width

AGKVIDEOHEIGHT2 is the secondary screen height

Screen is the chosen screen configuration. This is an X Windows environment variable for selecting in XF86Config-4.

Support for the legacy variables is maintained for backward compatibility. If resconfig detects the "Version=2" line, the resconfig will switch to a new system that uses the following variables:

AGKVIDEO. This variable has two values: (1) "V2Legacy" and (2) "V2GL." This variable is used to select the base server.

AGKSCREEN1. This variable encapsulates the video.cfg options for screen 1. The AGKSCREEN1 variable includes the screen resolution and orientation. Using the above config file example, the AGKSCREEN1 variable for screen 1 would be "$1280\times10^{24}$R". An empty AGKSCREEN1 variable indicates that screen 1 is not available.

AGKSCREEN2 is the variable for screen 2 and provides the same information as AGKSCREEN1.

AGKSCREEN3 is the variable for screen 3 and provides the same information as AGKSCREEN1.

AGKSCREEN4 is the variable for screen 4 and provides the same information as AGKSCREEN1.

Figure 3:
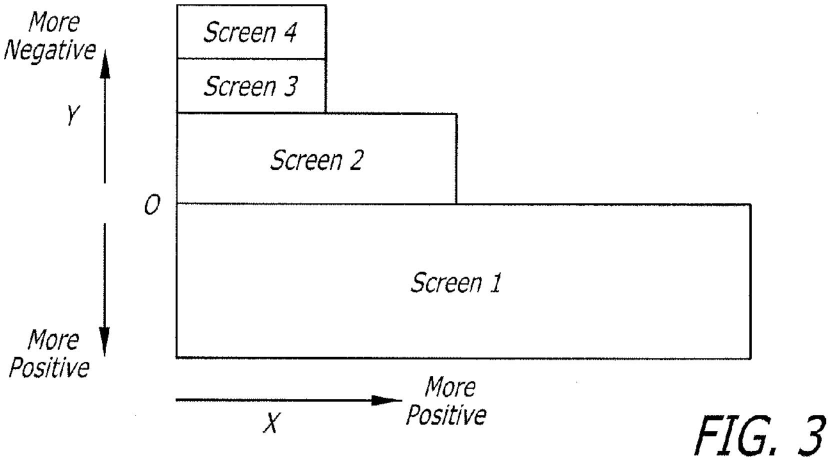
FIG. 3 is a schematic diagram of one embodiment of a layout for multiple monitors.

In one embodiment, the display screens present a given sprite as determined by its coordinates. Accordingly, the various display screens need to have their coordinates logically arranged to present these sprites. FIGS. 3-4 illustrate two embodiments of a four-monitor layout of logical coordinates. During start-up, the video server logically arranges the coordinates for the screens into one coordinate space, with the first screen having positive y coordinates and the second screen having negative coordinates, as shown in FIGS. 3-4. In one embodiment, the following rules are used to arrange the logical coordinates of the monitors in a gaming device:

Screen1 has coordinate (0, 0) in uppermost left coordinate with increasing positive x to right and increasing positive y going down.

Screen2 has coordinate (0, 0) in the bottommost left coordinate, with more negative y moving up the screen real estate.

Any display rotation is transparent to the logical coordinates.

As shown in FIGS. 3-4, screen 3 is stacked onto screen 2, and screen 4 is stacked onto screen 3. Screens 3 and 4 are pushed further into negative y regions. In FIG. 3, the screens all have similar orientations whereas FIG. 4 shows screens 1 and 3 as rotated and screens 2 and 4 have their original orientation. FIGS. 3-4 further illustrates that once the coordinates are laid out, the rotation or non-rotation of the screen is transparent to coordinate arrangement. In one embodiment, the games use a Video::GetScreenBounds API to get the rectangle coordinates that bound a given screen (i.e., screens 1-4). These dimensions are then used to build the root sprites for each screen. In another embodiment, if the Windows API is implemented, a screen root sprite is encapsulated in the windowing process.

When each video extension is loaded, the video extension will be associated with a specific screen. Only one screen may be handled by any extension instance, but one screen may have multiple extension libraries. This rule prevents the library from confusing two screen spaces or needing to switch to use different OpenGL calls depending on version supported. Additionally, the extensions are not given absolute coordinates in full x-y layout. Rather, the video extensions are given the sprite display area bounding sizes that the video extension is asked to render. Generally, the sprites are expected to be full screen sprites so the bounds are relative coordinates/bounds for each individual screen.

FIG. 5 illustrates a threading design for four-monitor support in a gaming device where each monitor has separate render loops. The separate render loops allow for run-time support of both processors as well as smoother and more processor-intensive rendering. The IPC dispatch loop controls the global state across all monitors, such as, but not limited to, the loading and unloading of images and fonts. The ScreenManager threads control the state of each monitor, including the sprites displaying on the monitor, their positions, rotations, and related data associated to objects on a particular screen.

Figure 6A:
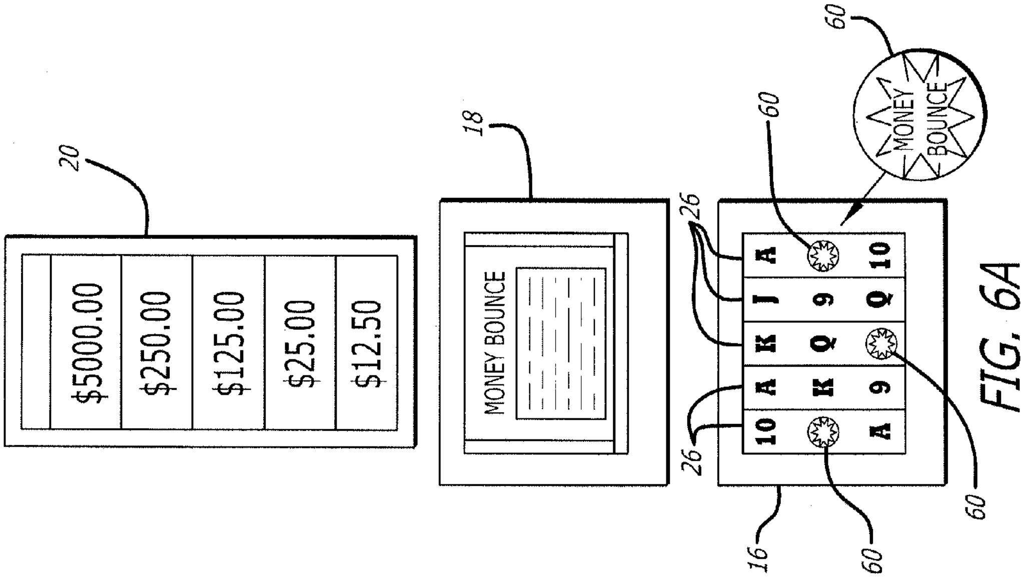
FIG. 6A-6E are screen shots of various embodiments of a game presented on the gaming device of FIG. 1.
Figure 6B:
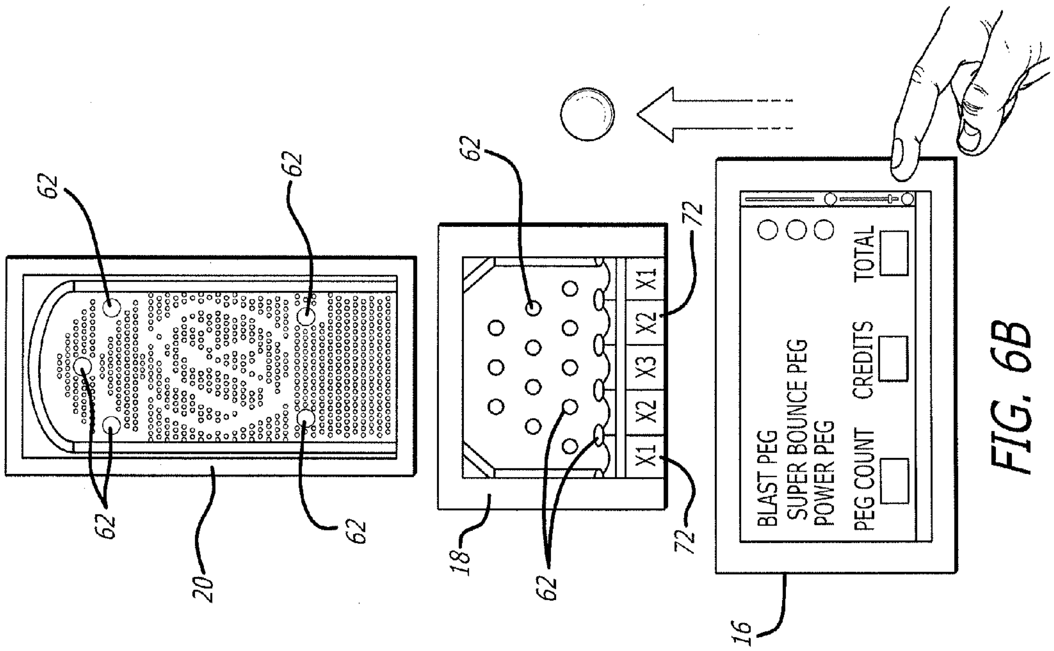

FIGS. 6A-6E illustrates screen shots of one embodiment of a game that may be presented on the gaming device 10 depicted in FIG. 1. Generally, the bonus game (also referred to "money bounce" bonus game) is initiated in response to a triggering event. The player is awarded one to five balls during play of the base game for use in the bonus game. As shown in FIG. 6B, the player launches a ball into the field-of-play in the bonus game by gesturing on the touch screen associated with the first display 16. Alternatively, the player may actuate an electromechanical button to launch the ball into the field-of-play. As the ball proceeds down the field-of-play (i.e., the ball moves from the top to the bottom of the screen), the player earns credits for each peg hit by the ball. In one embodiment, actual physics (e.g., gravity and collisions) may be used to simulate the path in which the ball travels through the field-of-play. The ball eventually falls into one of the slots 72 at the base of the second display 18. If the ball falls into a slot with a particular multiplier value, the total number of credits won by the player in the bonus game is then multiplied according to the value of the multiplier. In other embodiments, the bonus game does not include multiplier slots at the base of the field-of-play.

FIG. 6B illustrates one embodiment of a bonus game that uses the second and third displays 18, 20 for game play. The money bounce bonus game is composed of a main field-of-play presented on the second display 18 having a plurality of pegs 70 in which the pegs have different credit values, as shown in FIG. 6B. Additionally, the game may also include "special" pegs 66 that provide unique functionality or prizes as shown in FIG. 6C. As shown in FIG. 6B, the second display 18 is used to provide bumpers 62 and slots 72 associated with multiplier values. In other embodiments, the bonus game does not include any slots.

Once the bonus game is triggered, the game determines the number of balls for bonus game play and the layout out of the bonus game. In one embodiment, the type and location of a special peg may also be selected. FIGS. 6C and 6D are examples of possible bonus game layouts. In one embodiment, a player's wager amount determines the number of balls and the field layout. As discussed below, there are other possible criteria that may be used to determine the number of balls and the field layout.

In one embodiment, if a player makes a small bet (e.g., minimum bet), the selected field layout for the bonus game may allow a player to win up to a maximum of 10,000 credits (taking into account the top multiplier value). In another embodiment, if a player makes a medium-sized bet, the selected field layout may allow a player to win up to a maximum of 10,000 credits (taking into account the top multiplier value). In yet another embodiment, if a player makes a large bet (e.g., maximum bet), the selected field layout may allow a player to win up to a maximum of 10,000 credits (taking into account the top multiplier value).

Similarly, the number of balls may be based on the size of the wager. In one embodiment, a small bet is awarded a single ball for play in the bonus game. A medium-sized bet is awarded three balls for play in the bonus game, and a large bet (e.g., maximum bet) is awarded five balls for play in the bonus game.

Additionally, the size of the player's wager may determine the values of the pegs on the field-of-play as well as the number and type of "special pegs." Generally, the different valued pegs are represented by different colors (e.g., blue, green, and red pegs). The pegs may be placed randomly or in a predetermined pattern on the field of play. In one embodiment, the blue pegs are worth three credits, the green pegs are worth five credits, and the red pegs are worth 10 credits. In other embodiments, the pegs may be assigned different colors and/or credit values. When a peg is hit by the ball during play of the bonus game, the credit meter is incremented according to the value of the peg, and the peg disappears from the field-of-play. Alternatively, the peg that is hit remains in the field-of-play.

In some embodiments, one or more "special" pegs may be placed in the field-of-play. The "special" pegs have additional effects on the ball, field-of-play, other pegs, or any combination thereof. For example, a "blast" peg will explode and will blow up those pegs in close vicinity to the "blast" peg, as shown in FIGS. 6B-6C. The player is then awarded the credit value of all the pegs destroyed by the "blast" peg. A "super bounce" peg doubles the rebound of the ball as compared to the rebound of normal pegs in the field-of-play. As a result, the ball may be able to hit more pegs and increase the amount of credits won during bonus play. A "power" peg causes a ball to crash through other pegs in the field-of-play. That is, the ball maintains its trajectory and does not have collisions (e.g., bounce off) with other pegs in the play of field. Hitting a "multi-ball" peg will cause the ball to produce two or more balls in the field-of-play, thereby increasing the number of pegs that may be struck in the field-of-play. An "extra ball" peg will generate an extra ball when stricken. In one embodiment, the extra ball provides an extra opportunity to play the bonus game. Alternatively, the extra ball is placed in play with the original ball, thereby resulting in two balls in the field-of-play. A "color kill" peg will cause all the pegs having a similar color to be destroyed and awarding the player all the credits for the destroyed pegs. As those skilled in the art will appreciate, the "color kill" peg may be reconfigured or renamed to essentially achieve the result of destroying a group of pegs and awarding the value of all the destroyed pegs to the player.

FIG. 6D illustrates another embodiment of the field-of-play for the bonus game. In this embodiment, there are three "special" pegs. If a "kill all" peg is hit during the bonus game, all the pegs in the field are destroyed, and the player is awarded all the credits for all the destroyed pegs. If a "devil" peg 66 is hit, this peg catches on fire and burns all the pegs above the "devil" peg. The player is awarded the credits for all the pegs burnt by the "devil" peg. A "super multi-ball" is similar to the "multi-ball" peg except that the "super multi-ball" peg will cause all the pegs on the field-of-play to become "super multi-ball" pegs. As each "super multi-ball" peg is hit, a cascading effect of a mass of balls dropping down the field-of-play will occur. The player is awarded the credit value of the pegs that are struck by the mass of balls.

Additionally, as shown in FIGS. 6A-6D, the field-of-play on the second and third displays 18, 20 include bumpers 62. The bumpers 62 are used to channel one or more balls to ensure that a player get a fair chance to hit hard to reach pegs. In some embodiments, the amount of rebound may be increased or decreased in order to change the amount of play on the ball(s).

Figure 6E:
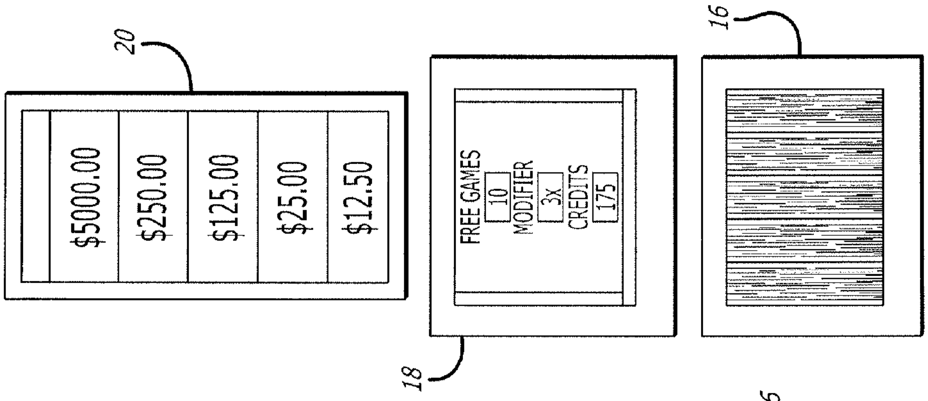
Figure 6D:
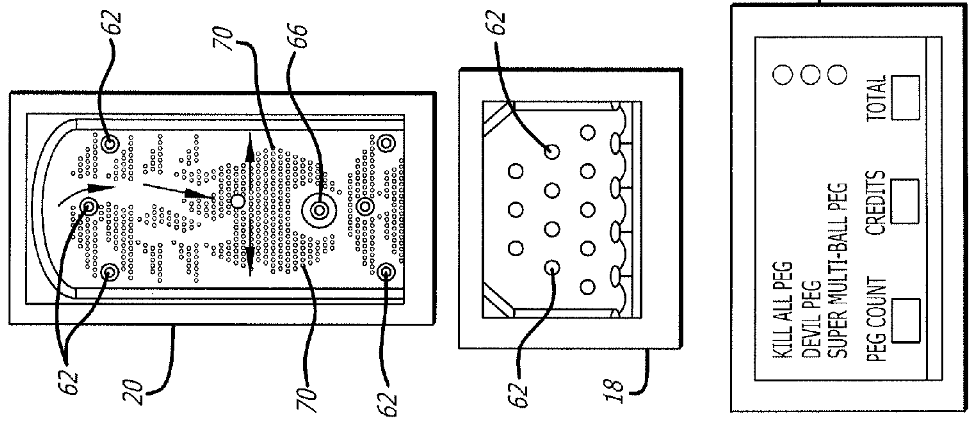
Figure 6C:
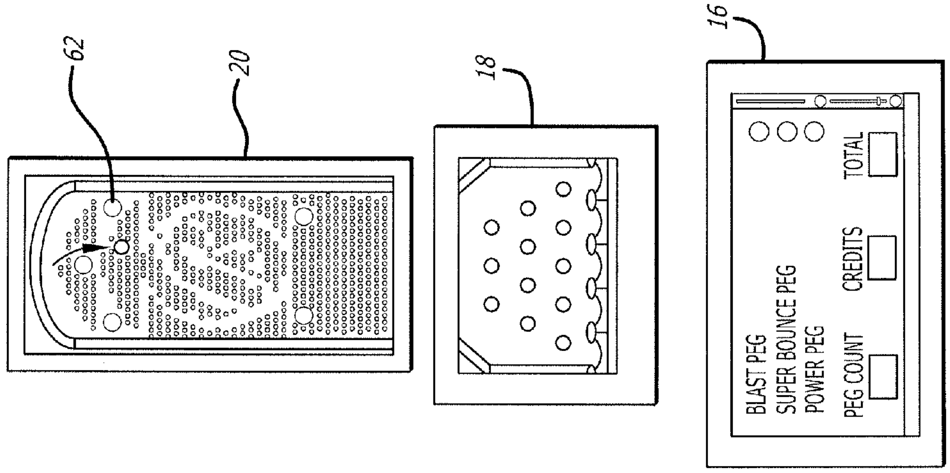

FIG. 6E illustrates a free game feature. When a player hits at least one "free game" symbol during play of the base game, the player is awarded free spins of the base game. In one various embodiments, the player is eligible for the free game feature when three, four, or five "free game" symbols appears in the base game. The player is awarded a number of free games, and the outcomes of the free game feature are subject to a multiplier. As those skilled in the art will appreciate, any criteria may be used to determine the number of games as well as the value of the multiplier. When the free game feature is triggered, the middle screen 18 transitions to present the number of remaining free games, the multiplier value applied to the outcomes of the free game, and a credit meter showing a running total of the credits won during the free game feature. During play of the free game feature, the player may win opportunities to play the money bounce bonus game if a "special" symbol appears on the reels. Once all the free games have been played, the game will transition to the money bounce bonus game, if the player has hit any "special" symbols. Otherwise, the free game feature ends, and the gaming device transitions back to the base game.

Figure 7C:
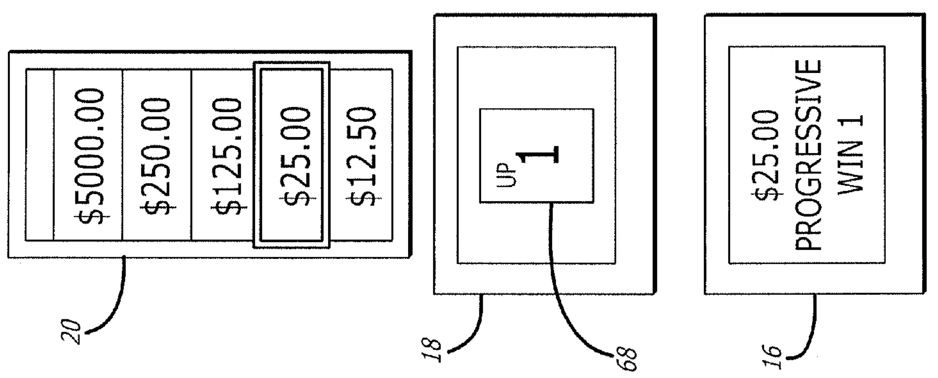
FIG. 7A-7C are screen shots are screen shots of various embodiments of a game presented on the gaming device of FIG. 1.
Figure 7B:
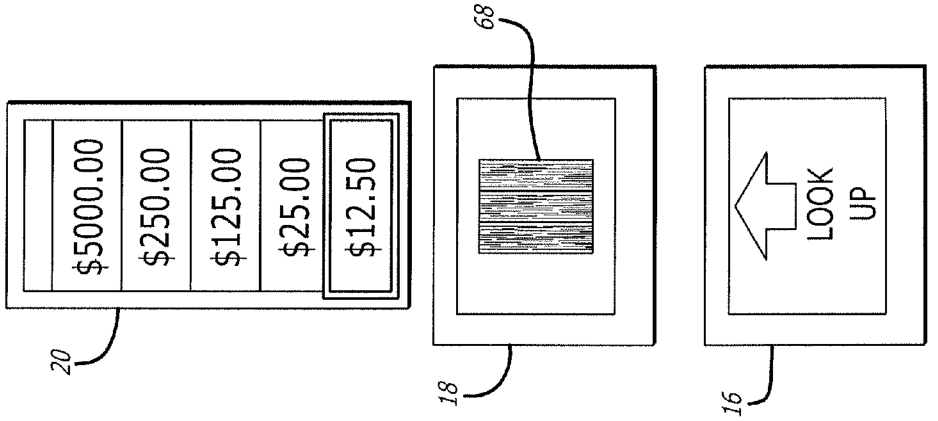
Figure 7A:
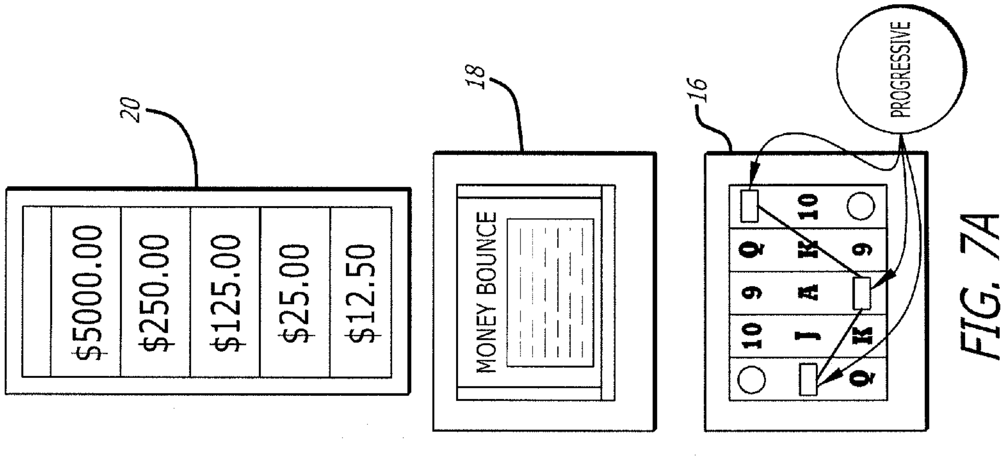

FIGS. 7A-7C illustrates screen shots of one embodiment of a progressive bonus game that may be presented on the gaming device 10. Generally, the progressive game is triggered by hitting one or more "progressive" symbols during play of the base game. In one embodiment, three scattered "progressive" symbols trigger the bonus game. For example, the "progressive" symbol appears on reels 1, 3, and 5 or reels 2, 3, and 4. In other embodiments, the appearance of three "progressive" symbols anywhere on the display triggers the progressive bonus game.

As shown in FIG. 7A, the top display 20 presents a list of progressive prize values. The middle display 18 presents a digital image of a single reel 68 in which the outcome of the will determine the number of moves up the progressive list. As shown in FIG. 7B, the bottom display 16 presents animation to prompt the player to watch the play of the bonus game on the middle screen 18. According to one embodiment, the reel has the following symbols: Up1 which moves the player up one level of the ladder; Up2 which moves the player up one level of the ladder; Up3 which moves the user up three level of the ladder; a "collect" symbol that ends the feature and pays the current amount of the wager; and a "special ball" symbol that triggers play of the bonus game depicted in FIGS. 6B-6D. FIG. 7C illustrates the outcome of the reel spin (e.g., Up 1), and shows that the progressive prize has moved up 1 slot from $12.50 to $25. The progressive bonus game ends when the "collect" symbol appears on the reel.

In another embodiment, the game presented on the gaming device 10 includes an instant win feature. The instant win feature is randomly awarded every X number of spins during play of the base game. When the instant win feature is triggered, the second and third displays 18, 20 transition to the field-of-play for the bonus game depicted in FIG. 6B-6D. The player is awarded one ball to launch into the field-of-play. Similarly, the instant win bonus game will have different layouts based upon the player's wager. For example, the player making a maximum wager (and hitting the instant win) is eligible to play the bonus game with the layout having the highest payout whereas the player making the minimum wager is only eligible to play the bonus game with the layout having the lowest payout. Alternatively, the layout for the field-of-play is the same for all wager values, but the multiplier value in the slots may be varied based on the player's wagers. In yet another embodiment, the layout for the field-of-play is the same for all wager values, but the value of the pegs is varied based on the player's wagers.

Figure 8:
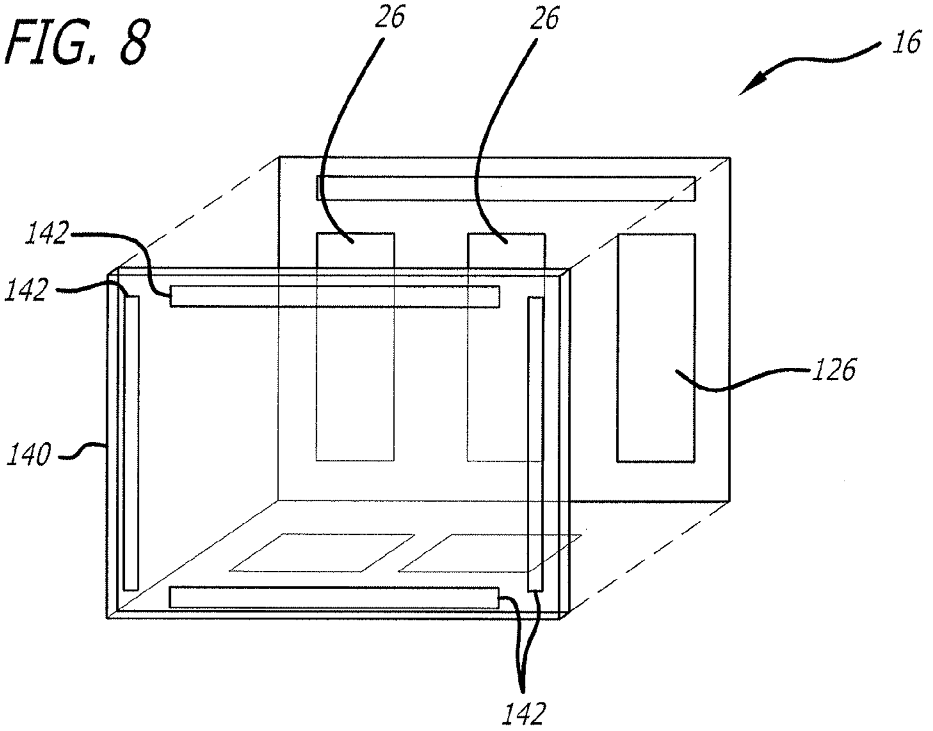
FIG. 8 is one embodiment of an exploded perspective view of the touch panel system that may be incorporated into one or more displays of the gaming device of FIG. 1.
Figure 9:
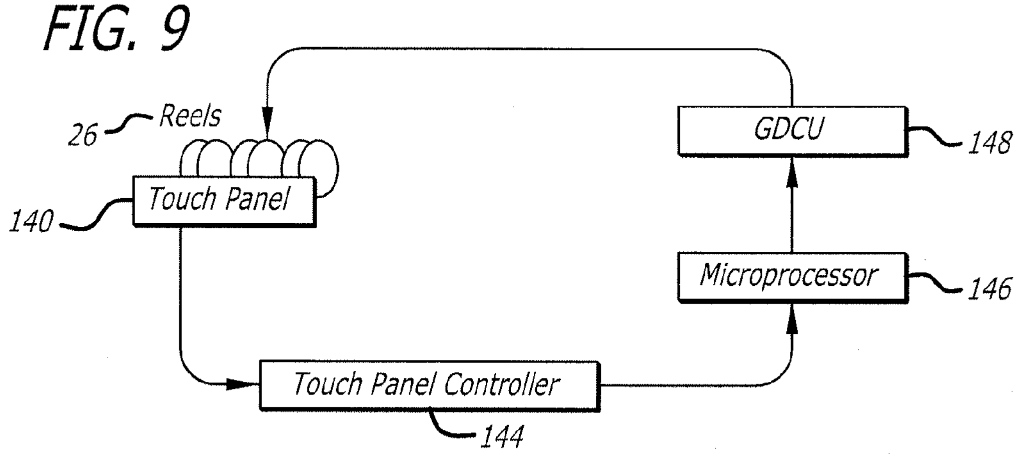
FIG. 9 is an operational flow diagram of a gaming device having a touch panel system.
Figure 10:
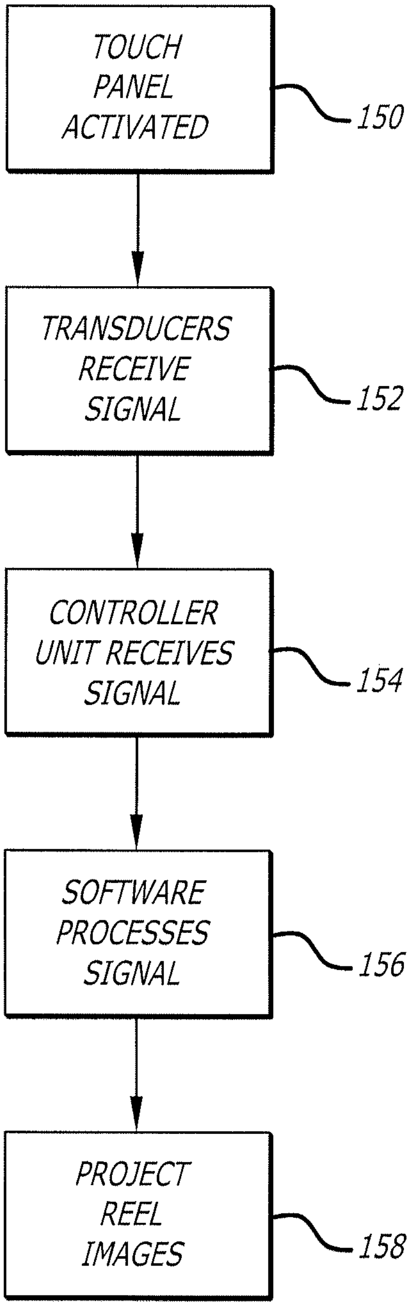
FIG. 10 is an operational flow diagram of a gaming device having a touch panel system.

FIGS. 8-10 illustrate one embodiment of a touch sensor assembly 142 incorporating a substantially transparent touch panel 140, a touch controller 144, and touch panel software. As shown in FIG. 8, the touch panel 140 utilizes the touch sensor assembly 142 to produce touch data when touched or activated, as well as allowing substantially unobstructed viewing of the projected images of the reels 26 shown on a display 16 behind the touch panel. The touch sensor assembly 142 includes one or more touch pad areas (not shown), one or more touch transducers 138, wave reflectors (not shown), cabling (not shown), a bezel (not shown), a touch panel controller 144, touch panel driver software, and touch panel application software. The material for the touch pad areas (not shown), is either glass or other polymeric material suitable for propagating surface acoustic waves.

As shown in FIG. 8, the touch panel 140 is placed in front the projected images of the reels 26. Touch panel data received by the touch panel 140 is transmitted to the touch panel controller. The touch panel controller 170 acts to control and interpret touch data from the touch panel 140. The controller 144 typically includes a printed circuit board assembly, often encased inside a metal or plastic housing with mounting holes. In one embodiment, the controller 144 is mounted to the inside of the gaming machine door or cabinet, and is preferably within reach of the touch panel wiring (not shown). The controller 144 is wired to the appropriate power and communication connections within the gaming machine. The controller 144 outputs a data stream consisting of touch coordinate information.

In one embodiment, the microprocessor 146 runs an application that translates the touch panel controller 144 serial touch information into reel control commands for the GDCU reel controller 148. The application uses drivers to communicate with the GDCU 148 which controls the image presented on display 16. The GDCU 148 is a communications portion of the gaming machine 10 which "talks" to the different components of the gaming machine.

FIG. 9 illustrates the operational flow of a gaming machine 10 including a touch panel system. As shown in FIG. 9, the logical operations of the various embodiments of the touch screen system are implemented (1) as a sequence of computer implemented steps or program modules running on a computing system and/or (2) as interconnected machine logic circuits or circuit modules within the computing system. The implementation is a matter of choice dependent on the performance requirements of the computing system implementing the touch panel system. Accordingly, the logical operations making up the embodiments of the touch panel system described herein are referred to variously as operations, structural devices, acts or modules. It will be recognized by one skilled in the art that these operations, structural devices, acts and modules may be implemented in the system, in firmware, in special purpose logic, analog circuitry, or any combination thereof.

As shown in FIG. 10, the logical operations of a touch panel system 136 utilize the components of the system in a logical sequence. In the panel activation step 158, the touch panel 140 is activated. This occurrence produces a signal that is received by the transducers 138 associated with the touch panel 140 in the transducer signaling step 152. In the controller signaling step 154, a signal is sent to the touch panel controller 144 reporting the activation of the touch panel 140. From the touch panel controller 144, a signal is then sent to, and interpreted by, the touch panel software (which is in the microprocessor 146) in the signal processing step 156. Finally, the touch panel software sends a signal to the GDCU reel controller 148 to spin the reel images 26 at step 158.

The touch panel system 136 is adapted to detect and interpret different types of touch data. For example, in one embodiment, the touch data in the form of a touch gesture generally parallel to the reels will cause the image of the reels to spin. The touch gesture in a "slide up" or "slide down" motion will initiate the spinning of the reels. The gesture causes the reels to spin in the particular direction of the gesture. For example, if the gesture moves top-down on the touch screen, the reels spin in a top-down direction. Alternatively, if the gesture moves bottom-up on the touch screen, the reels spin in a bottom-up direction. Additionally, the speed of the gesture may effect the speed of the spinning of the reels. For example, if the gesture is fast, the reels spin fast whereas the reels will spin slower for a slower gesture. Generally, any gesture on the touch screen that is parallel to the image of the reels will cause all the reels to spin. In another embodiment, the player needs to make a gesture at a particular area adjacent to the image of the reels in order to cause the image of the reels to spin. In yet another embodiment, the player can gesture to control each reel. Accordingly, the player may vary the order and/or speed of each reel spun.

As discussed above, the gaming device 10 is reconfigured to present secondary or bonus game in response to a triggering event. Generally, once a triggering event has been established, a player initiates play of the secondary game. Alternatively, the secondary game is automatically started in response to the triggering event. The triggering event is a condition that needs to be satisfied in order to initiate play of a secondary game on the video display 18, 20. According to one embodiment, the triggering event is a computer or system generated response such as, but not limited to, a message from a system host, a message from another networked gaming machine, or a winning outcome in a primary game. For example, the triggering event may be a symbol combination of "cherry-cherry-cherry" for a slots-type game. In another embodiment, the triggering event is one or more bonus symbols located on one or more reels. By way of example, and not of limitation, a triggering event is three or more bonus symbols located on reels 1, 3, and 5. In a poker game, the triggering event may be a pair of jacks or better. In other embodiments, the triggering event may be any winning outcome having a low or high probability. In those embodiments where a gaming machine presents both a primary game and a secondary game, the triggering event may be an outcome in either the primary or the secondary game. The primary game and/or the secondary game may be a video game or a mechanical game (e.g., a game having one or more reels or wheels). As those skilled in the art will appreciate, the triggering event may be any possible game outcome and does not necessarily have to be a winning outcome.

Additionally, triggering events may be based upon player activity/actions. For example, the triggering event may be based upon player performance such as, but not limited to, inserting a player tracking card into the gaming machine, time of play, frequency of play (i.e., number of games played in a particular period of time), number of maximum bets, number of player points earned, or a combination thereof. Additionally, a triggering event may be the player possessing a radio frequency identification (RFID) tag while playing a gaming machine. In these embodiments, a random performance characteristic may be selected to initiate the single-player-initiated, grouped bonus period. For example, the bonus period may be triggered when a player has continuously played the game for 30 minutes. Alternatively, achieving a predetermined performance threshold for a particular performance characteristic may be required to initiate the limited-time bonus period. For example, a bonus period may be initiated when a player has made twelve maximum bets. In another embodiment, the triggering event may be based upon the number of credits on the gaming machine. That is, a random or predetermined number of credits will trigger the bonus period. As those skilled in the art will appreciate, one or more of any of the disclosed triggering events may be required to initiate a single-player-initiated, grouped bonus period.

Referring back to FIG. 1, the main cabinet 14 of the gaming machine 10 is a self-standing unit that is generally rectangular in shape. In another embodiment, the main cabinet is a slant-top gaming cabinet. Alternatively, in other embodiments, the gaming cabinet may be a bar-top, table-top style cabinet, or any shaped cabinet known or developed in the art that is sized for a player to be able to sit or stand while playing a game. Additionally, the cabinet 14 may be manufactured with reinforced steel or other rigid materials that are resistant to tampering and vandalism. Optionally, in an alternate embodiment, the gaming machine 10 may instead be a cinema-style gaming machine (not shown), as disclosed in U.S. patent application Ser. No. 11/225,827, entitled "Ergonomic Gaming Cabinet," filed on Sep. 12, 2005, which is hereby incorporated by reference.

As shown in FIG. 1, the gaming device includes a top box 12. According to one embodiment, the top box 12 is a separate and distinct component that is affixed to the main cabinet 14. In another embodiment, the top box 12 is an area that is partitioned from the main cabinet 14. Alternatively, the top box 12 and the main cabinet 14 may be contiguous areas with the outward appearance of two distinct components.

The main cabinet 14 of the gaming machine also houses a game management unit (not shown) that includes a CPU 119, circuitry, and software for receiving signals from the player-activated buttons 24 and a handle (not shown), operating the games, and transmitting signals to the respective game displays 16, 18, 20 and speakers (not shown). Additionally, the gaming machine includes an operating system such as Bally Gaming's Alpha OS, as disclosed in U.S. Pat. No. 7,278,068, which is hereby incorporated by reference.

In various embodiments, the game program may be stored in a memory (not shown) comprising a read-only memory (ROM), volatile or non-volatile random access memory (RAM), a hard drive or flash memory device or any of several alternative types of single or multiple memory devices or structures.

As shown in FIG. 1, the gaming machine 10 includes a plurality of player-activated buttons 24. These buttons 24 may be used for various functions such as, but not limited to, selecting a wager denomination, selecting a number of games to be played, selecting the wager amount per game, initiating a game, or cashing out money from the gaming machine 10. The buttons 24 function as input mechanisms. The buttons may be mechanical buttons, electromechanical buttons or touch screen buttons. Additionally, other input devices such as, but not limited to, a touch pad, a track ball, a mouse, switches, and toggle switches, are included with the gaming machine to also accept player input. Optionally, a handle (not shown) may be "pulled" by a player to initiate a slots-based game.

In another embodiment, one input mechanism is a universal button module that provides a dynamic button system adaptable for use with various games, as disclosed in U.S. patent application Ser. No. 11/106,212, entitled "Universal Button Module," filed Apr. 14, 2005 and U.S. patent application Ser. No. 11/223,364, entitled "Universal Button Module," filed Sep. 9, 2005, which are both hereby incorporated by reference.

In yet another embodiment, a virtual button deck may be provided on the player interface, as disclosed in U.S. patent application Ser. No. 11/938,203, entitled "Game Related Systems, Methods, and Articles that Combine Virtual and Physical Elements," filed Nov. 9, 2007, which is hereby incorporated by reference.

Figure 11:
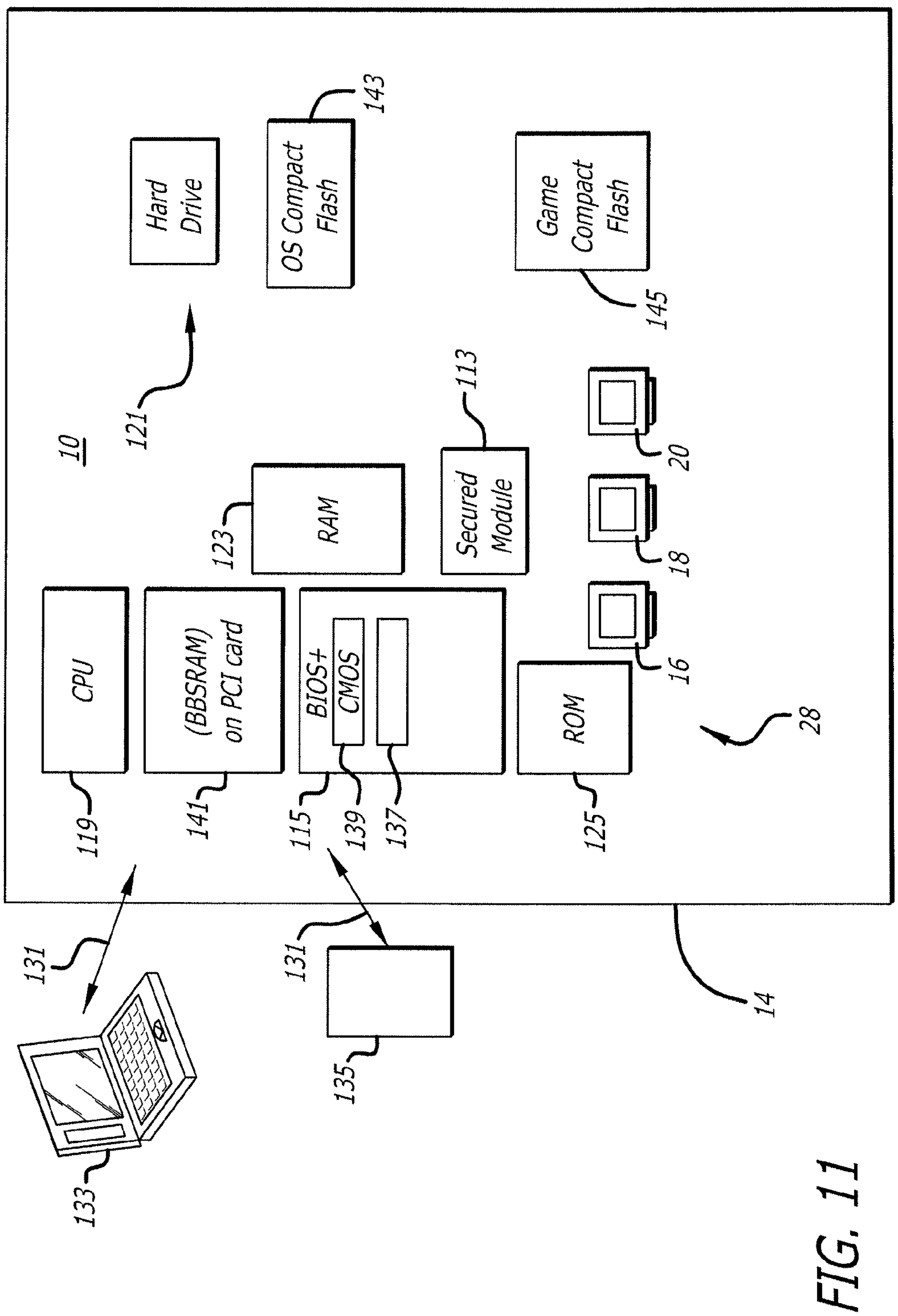
FIG. 11 illustrates a block diagram of one embodiment of the internal components of a gaming device.

FIG. 11 illustrates the internal components 28 of one embodiment of a gaming device 10. The components 28 comprise, for example, and not by way of limitation, software or data file components, firmware components, hardware components, or structural components of the gaming machine 10. These components include, without limitation, one or more processors 119, a hard disk device 121, volatile storage media such as random access memories (RAMs) 123, read-only memories (ROMs) 125 or electrically-erasable, programmable ROMs (EEPROMS) such as basic input/output systems (BIOS) 115. Additionally, the gaming device 10 includes a secured module 113. The secured module is a hardware component that is one-time programmable. One or more security algorithms may be provided on the secured module. The security algorithm generates a challenge (e.g., generates a random number), calculates an expected response to the challenge, and determines the validity of the BIOS based on the response to the challenge provided by the BIOS. In one embodiment, the secured module is a field-programmable gate array (FPGA). In another embodiment, the secured module is a trusted platform module (TPM).

In one embodiment, components 28 also include data files (which are any collections of data, including executable programs in binary or script form, and the information those programs operate upon), gaming machine cabinets (housings) 14, displays 16, 18, 20 or compact disk, read-only memory (CDROM) or CD read-write (CD-RW) storage. In one embodiment, the data files may include data storage files, software program files, operating system files, and file allocation tables or structures. Ports 131 are be included with the gaming machine 10 for connection to diagnostic systems 133 and other input/output devices 135. In one embodiment, the ports 131 each comprise a serial port, universal serial bus (USB) port, parallel port or any other type of known port, including a wireless port. Preferably, each of the components 117 have embedded or loaded in them identification numbers or strings that can be accessed by the processor 119, including the processor 119, itself, which are utilized for authentication as explained below. In one embodiment, the components that are data files each use their file path and name as their identification number or string.

Either within the gaming machine 10, or in the diagnostic system 133 attachable to the gaming machine 10, are executable instructions or a software program 137 for authentication of the components (authentication software 137), which itself may be one of the components 117 to authenticate if it is internal to the gaming machine 10. In one embodiment, authentication software 137 is stored on a persistent storage media such as the hard disk device 121, ROM 125, EEPROM, in a complementary metal oxide semiconductor memory (CMOS) 139, in safe RAM comprising a battery-backed static random access memory (BBSRAM) 141, in one or more flash memory components 143, 145, or other types of persistent memory. In one embodiment, the authentication software 137 is stored in a basic input/output system (BIOS) 115 device or chip. BIOS chips 115 have been used for storing prior authentication software, such as previous versions of the BIOS+ chip used by Bally Gaming Systems, Inc. of Las Vegas, Nev. in their EVO gaming system. Placing the authentication software 137 in the BIOS 115 is advantageous because the code in the BIOS 115 is usually the first code executed upon boot or start-up of the gaming machine 10, making it hard to bypass the authentication process. Alternatively, in one embodiment, the authentication software 137 is stored in a firmware hub (FWH), such as Intel's 82802 FWH.

As an alternative, instead of, or in conjunction with, the hard disk device 121, another mass storage device is used, such as a CD-ROM, CD-RW device, a WORM device, a floppy disk device, a removable type of hard disk device, a ZIP disk device, a JAZZ disk device, a DVD device, a removable flash memory device, a hard card type of hard disk device, or solid state memory device.

In some embodiments, the gaming machine 10 is part of a gaming system connected to or with other gaming machines as well as other components such as, but not limited to, a Systems Management Server (SMS) and a loyalty club system (e.g., casino management personnel/system (CMP/CMS)). Typically, the CMP/CMS system performs casino player tracking and collects regular casino floor and player activity data. The gaming system may communicate and/or transfer data between or from the gaming machines 10 and other components (e.g., servers, databases, verification/authentication systems, and/or third party systems).

One of ordinary skill in the art will appreciate that not all gaming devices will have all these components or may have other components in addition to, or in lieu of, those components mentioned here. Furthermore, while these components are viewed and described separately, various components may be integrated into a single unit in some embodiments.

Figure 12:
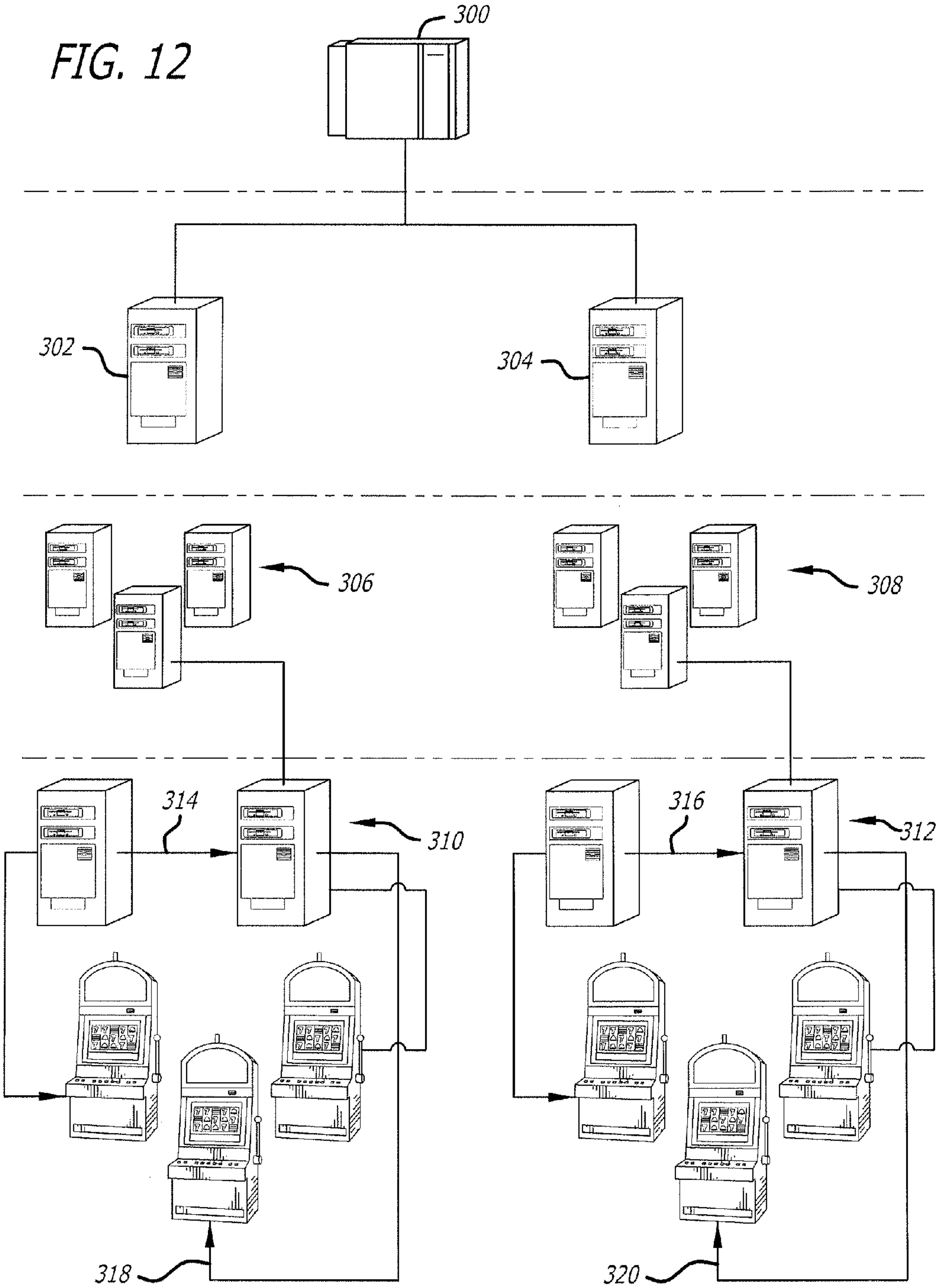
FIG. 12 illustrates one embodiment of a gaming system network including the gaming devices of FIG. 1.

An embodiment of a network that may be used with the gaming device is illustrated in FIG. 12. The example network consists of a top-level vendor distribution point 300 that contains all packages for all jurisdictions, one or more jurisdiction distribution points 302 and 304 that contain regulator-approved, production-signed packages used within that jurisdiction or sub-jurisdiction, one or more Software Management Points 306 and 308 to schedule and control the downloading of packages to the gaming machine, and a one or more Software Distribution Points 310 and 312 that contain regulator-approved, production-signed packages only used in the gaming establishment that it supports. The Software Distribution Points (SDPs) 310 and 312 can communicate with Systems Management Points (SMPs) 314 and 316, respectively as well as directly to one or more gaming machines 318 and 320. The system allows for rapid and secure distribution of new games, configurations, and OS's from a centralized point. It makes it possible to update and modify existing gaming machines with fixes and updates to programs as well as providing modifications to such files as screen images, video, sound, pay tables and other gaming machine control and support files. It provides complete control of gaming machines from a centralized control and distribution point and can minimize the need and delay of human intervention at the gaming machine. In one embodiment, the configuration control may be from the SDPs 310, 312 or from the gaming servers.

The various embodiments described above are provided by way of illustration only and should not be construed to limit the claimed invention. Those skilled in the art will readily recognize various modifications and changes that may be made to the claimed invention without following the example embodiments and applications illustrated and described herein, and without departing from the true spirit and scope of the claimed invention, which is set forth in the following claims.

What is claimed:

1. A gaming device, comprising:

a gaming cabinet;

a first monitor, a second monitor, and a third monitor mounted in the gaming cabinet, wherein at least the first monitor presents one or more games;

a multi-core processor in communication with a first video chipset and a second video chipset, wherein the first and second video chipsets support the first, second and third monitors;

a video server in communication with the one or more games;

a first X server in communication with the video server and the first video chipset; and a second X server in communication with the video server and the second video chipset, the video server concurrently outputting graphical data associated with the one or more games to the first video chipset and the second video chipset enabling concurrent presentation on the first, second, and third monitors of the one or more games;

wherein the gaming device is configured to determine whether a triggering event has occurred to reconfigure the first, second and third monitors to display a secondary game, the secondary game having a plurality of configurations based upon a player wager, and to initiate reconfiguring the first, second and third monitors to display the secondary game upon determining that the triggering event has occurred;

wherein the gaming device is configured to configure the secondary game into a distinct configuration of the plurality of configurations based upon the player wager independently of initiating reconfiguring the first, second and third monitors to display the secondary game, such that certain items in a field of play each have distinct functionality determined by the player wager.

2. The gaming device of claim 1, further comprising a fourth monitor.

3. The gaming device of claim 2, wherein the first video chipset supports the first and second monitors and the second video chipset supports the second and third monitors.

4. The gaming device of claim 2, wherein the fourth monitor is provided on a player interface of the gaming cabinet.

5. A method for presenting a multi-monitor game on a gaming device, the method comprising:

providing a gaming device, wherein the gaming device includes a first display, a second display, a third display, and a multi-core processor in communication with a first video chipset and a second video chipset, wherein the first and second video chipsets support the first, second and third displays, the gaming device further including a video server in communication with a primary game and a secondary game, a first X server in communication with the video server and the first video chipset, and a second X server in communication with the video server and the second video chipset;

initiating play of the primary game on the first display in response to a player wager;

determining whether a triggering event has been established during play of the primary game;

upon determining that the triggering event has been established, reconfiguring the first, second, and third displays to present the secondary game, wherein the secondary game includes a plurality of configurations based on the amount of the player wager;

independent of initiating reconfiguring the first, second and third displays to present the secondary game, configuring the secondary game into a distinct configuration of the plurality of configurations based upon the amount of the player wager;

receiving player input initiating play of the secondary game;

concurrently outputting graphical data associated with the secondary game from the video server to the first video chipset and the second video chipset;

presenting the secondary game on the first, second, and third displays by using the first video chipset and the second video chipset; and awarding credits to the player based on an outcome of the secondary game, such that certain items in a field of play each have distinct functionality determined by the player wager.

6. The method of claim 5, wherein the primary game is a slots-game having five reels and the triggering event is three or more special symbols appearing on the reels during play of the primary game.

7. The method of claim 5, wherein the player input initiating play of the secondary game is a touch gesture.

* * * * *